Feb. 11, 1958  H. E. HAMMERS  2,822,834
MITERING GUIDES FOR HAND POWER SAWS
Filed Oct. 26, 1956
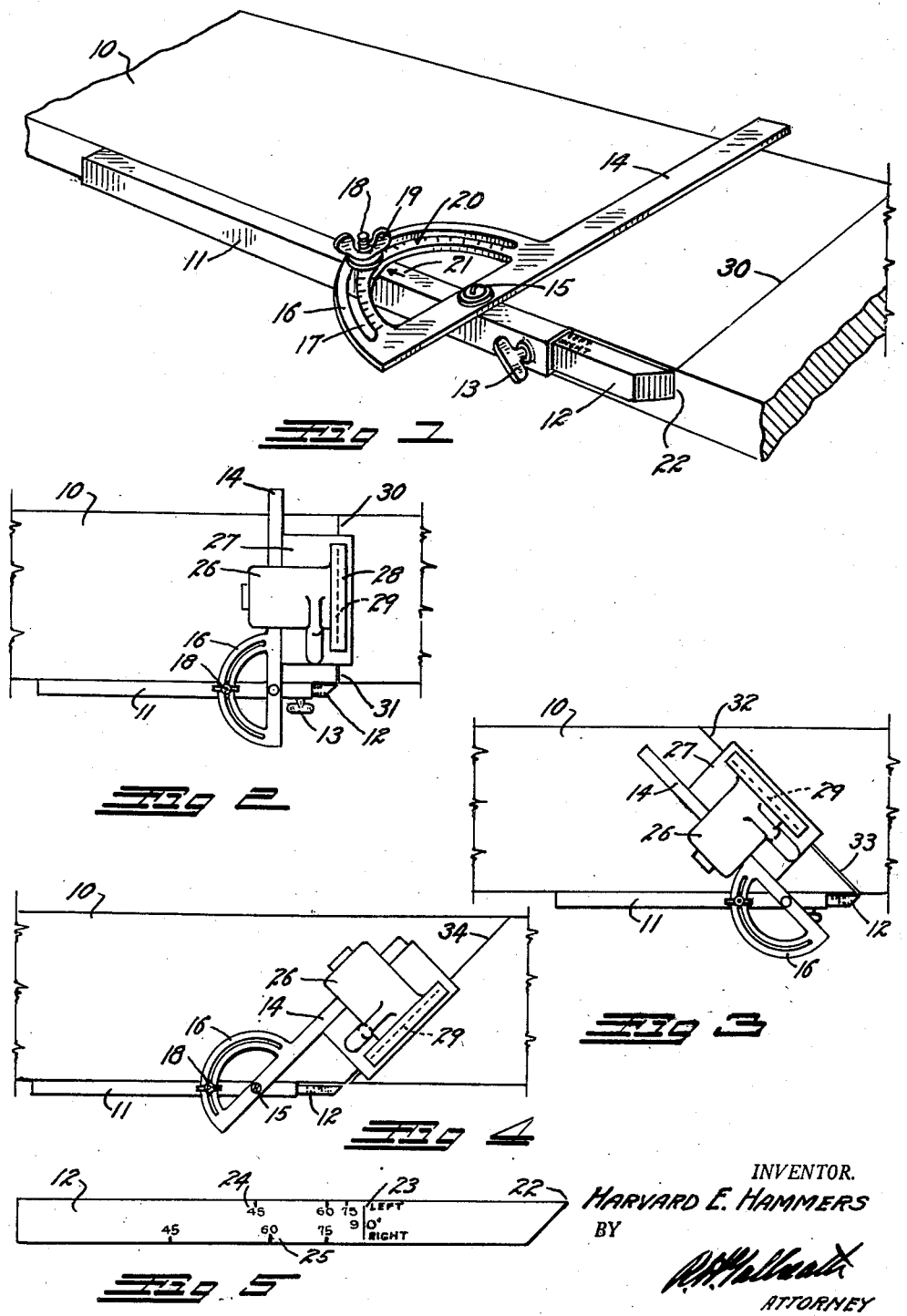
INVENTOR.
HARVARD E. HAMMERS
BY
ATTORNEY

United States Patent Office 2,822,834
Patented Feb. 11, 1958

2,822,834

MITERING GUIDES FOR HAND POWER SAWS

Harvard E. Hammers, Colorado Springs, Colo.

Application October 26, 1956, Serial No. 618,566

3 Claims. (Cl. 143—6)

This invention relates to a guide for portable power saws of the "Skil-saw" type and has for its principal object the provision of a simple, easily used device which can be quickly set to accurately guide a portable power saw at any desired preset angle across the board or beam to be cut.

Another object of the invention is to provide a portable power saw guide which will not damage the saw should the guide be accidentally misused.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view illustrating the appearance of the improved saw guide ready for use in making a 90° cut across a board;

Figs. 2, 3 and 4 are diagrammatic plan views illustrating various settings of the improved saw guide; and Fig. 5 is an enlarged detail view illustrating a pointer member employed with the improved guide.

In the drawing the workpiece or board to be cut is indicated at 10. The guide is designed for use with any of the conventional types of portable power saws. Such a saw has been diagrammatically indicated on the drawing, with its motor at 26, base plate at 27 and saw guard at 28. The position of the circular saw within the saw guard 28 is indicated in broken line at 29.

The improved saw guide comprises an elongated edge tube 11 preferably formed from square metallic tubing. A pointer member 12 of similar cross-section is slidably and telescopically mounted in one extremity of the edge tube 11 and can be locked at any desired projection from the tube 11 by means of a conventional winged set screw 13. A straight-edge member 14 is pivotally mounted upon the edge tube 11 in any desired manner, such as by means of a pivot screw 15 which is set back from that extremity of the tube 11 from which the pointer member 12 projects. The edge tube 11 and the straight-edge member 14 are prferably formed from lightweight metal, such as aluminum or the like, and the pointer member 12 is formed from relatively soft, easily cut material, such as wood. The straight-edge member 14 has an elongated portion adapted to extend over the board 10, and a shorter portion adapted to project outwardly from the tube 11 and beyond the near edge of the board.

A semi-circular sector 16 is attached to, or formed on, the straight-edge member 14 concentrically of the axis of the pivot screw 15. The sector is provided with a circumferentially extending, arcuate slot 17. A clamp screw 18 is fixedly mounted on the edge tube 11 and extends through the slot 17. The clamp screw is provided with a wing nut 19 by means of which the sector may be fixedly clamped to the edge tube 11.

The sector 16 is provided with a suitable degree-indicating scale 20, the indications of which can be aligned with an index mark 21 on the edge tube 11 to preset the angle of the straight-edge member 14 relative to the edge tube 11.

The extremity of the pointer member 12 is beveled so that it terminates in a relatively sharp position-indicating edge 22 and is provided with an index mark 23 indicating the "90°" position. It is further marked with the words "Left" and "Right," and in alignment with each of the latter words are degree scale markings 24 and 25, respectively.

Let us assume that it is desired to cut the board 10 along a guide line 30 drawn at 90° to the edge of the board, as shown in Figs. 1 and 2. The pointer member 12 is preset in the edge tube 11 so that the 90° mark 23 will align with the extremity of the edge tube and is locked in place by means of the set screw 13. The straight-edge member 14 is preset at 90° to the axis of the edge tube 11, by means of the scale 20, and is locked in the 90° position by means of the lock nut 19.

The indicating edge 22 is now placed in exact alignment with the line 30. The base plate 27 of the saw is placed against the straight-edge member to form a saw cut, as indicated at 31 in Fig. 2, accurately along the line 30.

Let us assume that it is desired to make a saw cut along a line 32 drawn at an angle of 45° to the left, as shown in Fig. 3. The sector 16 is set at 45° to the left and locked by means of the nut 19. The pointer member 12 is withdrawn to the 45° mark on the scale 24 opposite the word "Left" and locked in place. The base plate 27 of the saw is then forced forwardly along the straight-edge member 14 to form a saw cut 33 in accurate alignment with the line 32, as indicated in Fig. 3.

A saw cut along a mark 34 drawn at an angle of 45° to the right is similarly followed by the power saw by properly setting the sector 16 at 45° to the right and withdrawing the pointer member 12 to the 45° mark on the scale 25 and aligning the edge 22 with the mark 34, as shown in Fig. 4.

Should the saw blade be brought accidentally against the pointer member 12, it will nick or saw through the pointer member without damage to the saw. In the latter event, the user can quickly and easily insert a square piece of wood in the tube 11 and cut the extremity at 45° and place the desired markings thereon by simply manipulating the straight edge member 14 upon a previously marked board. Therefore, the pointer members can be quickly and easily renewed by anyone skilled in the art should they become lost or damaged, and they can be quickly and easily marked to fit various types and sizes of power saws by the saw user.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:

1. A mitering guide for guiding a power saw of the type having a base plate, one edge of which is spaced laterally from a power-driven circular saw, so that the circular saw will follow a predawn cutting line across a work piece, comprising: an elongated, hollow, rectangular edge tube adapted to be positioned along one side of the work piece in engagement with the edge thereof, and with its upper face in the plane of the upper face of the work piece; a straight edge member pivotally mounted on the upper face of said edge tube adjacent one extremity of the latter and adapted to lie upon the upper surface of said work piece as a guide abutment for the base plate of said saw; means for securing said straight edge member at any desired angle to said edge tube; an elongated, rectangular pointer member axially slidable in and projecting from said one extremity of said edge tube; and a set screw in said edge tube engaging said pointer member and locking the latter in said edge tube, with its extremities at a preset distance from said straight edge member so that when the extremity of the pointer member is positioned at said predrawn cutting line, and when said base plate is positioned against and forced forwardly along said straight edge member, said circular saw will follow said line.

2. A guide for guiding power saws as described in claim 1 in which said pointer member is provided with an indicating scale whereby said pointer member may be preset at any desired projection from said edge tube.

3. A guide for guiding power saws as described in claim 2 in which the pointer member is formed from a non-metallic material which may be cut by said saw without damage to the latter.

References Cited in the file of this patent

UNITED STATES PATENTS

| | | |
|---|---|---|
| 1,911,045 | Tinnen | May 23, 1933 |
| 1,960,590 | McKay | May 29, 1934 |
| 1,986,551 | Anderson | Jan. 1, 1935 |
| 2,735,456 | Grier et al. | Feb. 21, 1956 |
| 2,772,707 | Leino | Dec. 4, 1956 |